United States Patent [19]

Baer

[11] Patent Number: 5,210,636
[45] Date of Patent: May 11, 1993

[54] ROTATIONAL OSCILLATORY OPTICAL SCANNING DEVICE

[76] Inventor: Stephen C. Baer, 10 Poplar Rd., Cambridge, Mass. 02138

[21] Appl. No.: 732,599

[22] Filed: Jul. 19, 1991

[51] Int. Cl.⁵ .............................................. G02B 26/08
[52] U.S. Cl. ................................. 359/200; 310/40 R; 318/128; 359/876
[58] Field of Search ............................. 359/196–199, 359/212–214, 223–226, 200, 875, 876; 310/36, 40 R; 318/128, 611; 250/236

[56] References Cited

U.S. PATENT DOCUMENTS

| | | | |
|---|---|---|---|
| 3,453,464 | 7/1969 | Baker | 310/36 |
| 3,547,512 | 12/1970 | Baer | 359/226 |
| 3,642,344 | 2/1972 | Corker | 359/214 |
| 3,666,974 | 5/1972 | Dostal | 310/8.2 |
| 3,678,308 | 7/1972 | Howe | 310/36 |
| 3,846,784 | 11/1974 | Sinclair | 340/755 |
| 3,888,562 | 6/1975 | Rushing | 359/221 |
| 3,891,299 | 6/1975 | Rushing | 359/223 |
| 3,906,263 | 3/1975 | Chen et al. | 310/29 |
| 3,952,217 | 4/1976 | Rawlings | 310/36 |
| 4,021,716 | 5/1977 | Rue | 318/689 |
| 4,302,709 | 11/1981 | Tichtinsky | 318/116 |
| 4,613,203 | 9/1986 | Proetel | 359/214 |
| 4,619,498 | 10/1986 | Croiset | 359/214 |
| 4,902,083 | 2/1990 | Wells | 359/214 |
| 4,919,500 | 4/1990 | Paulsen | 359/214 |
| 5,040,860 | 8/1991 | Klotz | 359/223 |
| 5,063,336 | 11/1991 | Atlas | 318/611 |

*Primary Examiner*—Bruce Y. Arnold
*Assistant Examiner*—James Phan
*Attorney, Agent, or Firm*—Robert K. Tendler

[57] ABSTRACT

A compact system specially adapted for optical scanning in microscopes, substantially eliminates vibration associated with scanned elements which are rapidly reciprocated through relatively large angular arcs at substantial distances from a pivot axis by providing a counterrotating counterbalancing element and a second counterbalancing element rigidly connected to the scanned element in which the centers of mass of both the counterrotating counterbalance and the counterbalanced scanned element are placed on a single rotational axis about which the two counterbalanced systems oppositely rotate, thereby eliminating unbalanced momentum vectors to reduce transmission of vibration to the stationary supporting structures. The use of bearings between the counterrotating elements to promote cancelling of momentum vectors at the rotation axis, the application of driving torque between the counterrotating elements such that no reaction torque is applied to the supporting structure, aerodynamic resistance balancing, and balancing of the elastic force from power input connections to the counterrotating elements, further limit transmission of vibration to the stationary supporting structures to negligible levels while providing an exceptionally compact device.

20 Claims, 5 Drawing Sheets

ROTATIONAL OSCILLATORY OPTICAL SCANNING DEVICE

FIELD OF THE INVENTION

This invention relates to devices for scanning optical elements in microscopes, and specifically to devices for rotational oscillatory scanning of optical elements about axes at substantial distances from these elements, while minimizing the transmission of vibration to the base frame of the microscope.

BACKGROUND OF THE INVENTION

This invention relates to an improvement of a scanning device described in FIGS. 3, 4 and 5 of U.S. Pat. No. 3,547,512 to Stephen C. Baer, the inventor of the present invention. An aim of that prior art scanning device was to provide, in a scanning microscope, a mechanism for scanning an optical assembly about an axis located at a substantial distance from the assembly, while minimizing the transmission of vibration to the stationary microscope frame or "base frame" during scanning. Because the moment of inertia of a rotating mass is proportional to the square of its distance from the axis, the torque which a scanner must impart on a scanned element to reverse its direction of rotation, and therefore the countertorque imparted to the scanner with each reversal, is critically dependent on the location of the scanning axis with respect to the scanned element. Since the countertorque imparted to the scanner with these reversals is a source of vibration transfer to the base frame, the potential to transmit vibration to the base frame is also critically dependent on the location of the scanning axis. In the common scanning application where the scanned element can be centered on the scanning axis, the greatest distance from that axis to any part of the scanned element is one half of the length of that element in the dimension perpendicular to the axis, and most mass in the scanned element is much closer than that distance, resulting in a relatively small moment of inertia for a given scanned element mass. In contrast, the optical assembly described in U.S. Pat. No. 3,547,512 required scanning about an axis at a considerable distance from the center of mass of the scanned assembly, specifically, by a distance substantially larger than the largest dimension of the scanned assembly.

To help minimize vibration transmission to the base frame in the scanning device described in U.S. Pat. No. 3,547,512, a counterrotating counterbalance mass was mounted on the same axis of rotation as the axis of rotation of the scanned optical assembly, in such a manner that when the scanned optical element changed direction during oscillation, the resultant countertorque was transmitted to this counterbalance rather than to the base frame. Impulses of momentum during these reversals were applied to the base frame from the scanned assembly and from the counterbalance in equal magnitudes from opposite directions, thus cancelling each other. Furthermore, in the scanning device described in U.S. Pat. No. 3,547,512, the external power to sustain the oscillation was transduced into a torque between the two counterrotating elements, rather than as a torque between either of these elements and the base frame, again reducing transmission of vibration to the base frame.

The scanning device described in U.S. Pat. No. 3,547,512 was designed under the assumption that when employing a counterrotating counterbalance to reduce transmission of momentum to the base frame during scanning, this aim of reducing transmission of momentum would be best realized by minimizing the moment of inertia of the scanned assembly. Therefore to minimize surplus mass on the arm holding the mirror-slit assembly for rotation about the axis, the axis of rotation was placed at one end of this arm, and the mirror-slit assembly at the other end. In spite of these efforts, however, it was found that with this arrangement, no amount of adjustment could reduce vibration transmission to the base frame sufficiently to allow enclosure of the scanning device within the body of a compact microscope.

In the present scanning application, several additional factors besides the increased moment of inertia of the scanned element work against successful resolution of this vibration problem. Firstly, because the scanner is mounted on a microscope, which can experience significant image degradation with a vibration even in the submicron amplitude range, vibration must reduced much more than with many other scanning applications. Moreover, because the aim was to develop a compact microscope, there were limits on the use of sheer massiveness of the stationary microscope base frame to reduce vibration. Also, because the scanned element is in fact an assembly of optical elements, not only must the mass of these individual elements be scanned, but in addition the scanning load includes the mass of the structure required to insure that these elements remain in precise alignment during the stress of scanning, so that not only is the moment of inertia large in proportion to the scanned mass, but the scanned mass itself is also quite large, these two factors together generating an extremely large moment of inertia. Also, to produce a constant image brightness over the image field, it was considered important to maintain a linear scan velocity over the image field, ruling out simple sinusoidal scanners, which by eliminating the required periodic collisions, avoid much of the vibration generation of linear scanners such as described in U.S. Pat. No. 3,547,512. Finally, because in this type of scanning microscopy (confocal microscopy), image quality is almost always considerably improved by a brighter image, it is desirable to have as much of the scan time as possible spent during active imaging as opposed to dead time at the extremes of the scan, and consequently the collisions were required to transfer a maximum of force in the least time, again accentuating the problem of vibration transmission. In view of these considerations, none of the prior art scanning devices now described, by themselves or in combination, suggest a solution to this vibration problem.

U.S. Pat. No. 3,453,464 to Baker describes an oscillating system of two counterrotating masses mounted on a common axis of rotation which passes through the center of mass of each of these masses. When the scanning axis of a scanned element passes through the element or assembly it may be possible to locate the element such that its center of mass and the scanning axis coincide. U.S. Pat. No. 3,952,217 to Rawlings, for example, describes such an arrangement where the scanned mass could have been positioned so that the center of mass of the scanned element coincided with the rotation axis, though no explicit mention was made of such coincidence. Unfortunately, when the scanning axis must be external to the scanned optical element, this axis cannot pass through its center of mass.

U.S. Pat. No. 3,66,974 to Dostal, U.S. Pat. No. 3,642,344 to Corker and U.S. Pat. No. 4,919,500 to Paulsen describe a class of torsion bar resonant scanners with oppositely rotating masses, which are enlarged segments along the axis of a common spring metal element, excited into a mode of resonance where these segments rotate in opposite directions. These scanners lack bearings, a desirable feature from the point of view of the high frequency scanning of low mass balanced loads for which these scanners were designed, but making them poorly suited for the present scanning application. Bearings in a counterrotating scanning device, by insuring that the axes of the two oppositely rotating masses remain in strict alignment during scanning, can permit scanning of off-center loads such as the mirror-slit assembly in U.S. Pat. No. 3,547,512 because the bearings join and cancel forces generated by the active scanned mass against corresponding forces from the counterrotating mass. Such uncancelled forces would be particularly troublesome in these torsion rod scanners because of the ease of exciting unwanted modes of vibration, thus a centered load may be an intrinsic requirement. Each of these scanners is powered by torque applied between the base frame of the scanner and at least one rotating element, an arrangement which can allow transmission of vibration to the base frame. Furthermore, when such a bearingless scanner is used in any orientation other than strictly vertical for the central axis, and where relatively very large scanned masses are required, as in the present application, gravitational loading of the scanned element and the counterrotating mass can cause bending of the central shaft, resulting in lack of perfect coincidence between the axes of the oppositely rotating masses, further reducing the effectiveness of the cancellation of vibration.

Figure 3:
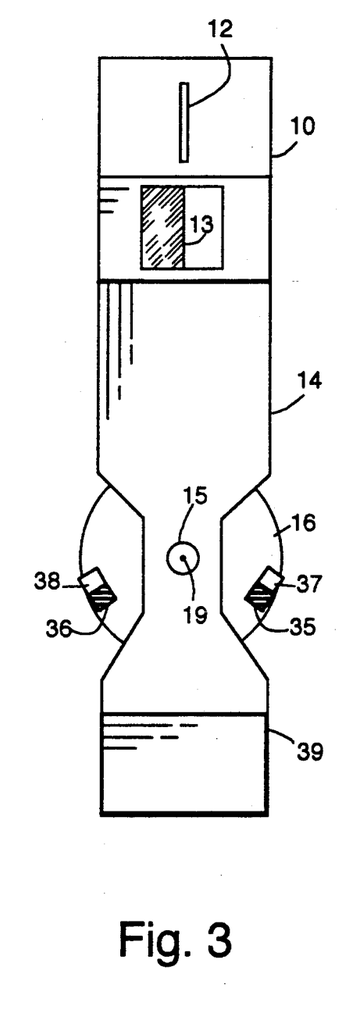
FIG. 3 is a plan view of this same scanning mechanism, as viewed from below, along the axis a—a' shown in FIG. 1.

U.S. Pat. No. 3,846,784 to Sinclair describes a device for reciprocally scanning an optical element (a digital display assembly of light emitting segments) about an axis located at a significant distance from such element, and counterrotation of a counterbalance element about the same axis. FIG. 3 of this patent shows an embodiment where part of the electrical motor mechanism is directly mounted on a rigid superassembly containing the scanned element, and such an arrangement would create the possibility of locating the scanning axis through the center of mass of the scanned superassembly even though such axis was external to the scanned optical element. However because in this FIG. 3 of U.S. Pat. No. 3,846,784, all the mass of such motor mechanism attached to the scanned element is shown to be on only one side of the line passing through the rotation axis and through the center the scanned element, the center of mass of the superassembly consisting of the scanned element, the motor element and the connecting member between these elements, cannot be coincident with the rotation axis. Therefore, for reasons which will be become apparent, this type of scanner will also be subject to the same type of residual vibration as the scanner described in U.S. Pat. No. 3,547,512.

(The scanned element will often be referred to here by the term "scanned assembly" in case this scanned element contains a plurality of elements which remain motionless with respect to each other during scanning and which cooperate with each other to perform the particular task for which scanning is required, thus, in the case of the mirror-slit assembly, the two slits and the mirror cooperate with each other to perform the particular optical task for which scanning is required. The term "superassembly" will refer to the scanned element or assembly in combination with all other elements which rotate as a solid body with the scanned element, including those elements which do not cooperate with the scanned element in the performance of its particular task, even though they may be necessary for the scanning of the scanned element. Examples of elements not cooperating with the scanned element in the performance of its particular task include elements which hold the scanned element in place in relation to the scanning axis, motor means to power the oscillation, bearings to constrain the rotation of the scanned elements, position measuring means to measure the scan angle, and counterbalances which do not cooperate with the scanned element in the performance of its particular task.)

Another prior art patent describing scanning of an optical element about an axis at a significant distance from its center of mass is U.S. Pat. No. 4,902,083 to Wells. Vibration transfer to the supporting structure was reduced by the presence of a counterrotating counterbalance which rotated about an axis parallel to the rotation axis of the scanned optical element. Because the device described in that patent had to be small and light weight enough to be mounted on a person's head, it was impractical to control residual vibration transmission simply by increasing the mass of the base frame. It was acknowledged in that patent that such a design inherently results in the transmission of some vibration to the base frame structure. Nevertheless the only solutions proposed to this vibration problem in the patent were to ignore the vibration or to attempt to isolate it by means of a compliant suspension, rather than to eliminate the vibration at its source which is the principal aim of the present invention.

Besides transmitting vibration to the base frame during scanning, when used to scan a relatively massive optical element about an axis at a substantial distance from the element, these prior art scanner designs require custom construction of the electromechanical and other components of the device, adding to the expense of the scanning device. In these prior art designs, the counterrotating member is of a size comparable to the active scanned member, and when the scanning axis must be a relatively large distance from the scanned optical element, the resultant large size of the scanner can pose a serious problems when the overall dimensions of the instrument should be as small as possible.

OBJECTS AND ADVANTAGES

It is the primary object of the present invention to improve devices containing two counterrotating elements rotating about a common scanning axis, for scanning an optical element about an axis at a substantial distance from the center of mass of the element, by significantly reducing residual vibration transmitted to the base frame supporting the axis.

Another object of the present invention is to provide a scanning device at a very low cost in relation to the mass of the element scanned, by adapting conventional stepper motors or motors adapted for continuous rotation to serve as the principal electrically powered torque generating component.

Yet another object of the present invention is to provide a scanning device where the scan movement is linear between the extremes of the scan as opposed to sinusoidal, yet avoiding the generation of large momentum impulses which can be transferred to the base support during scan reversals in linear reciprocal scanners.

A still further object of the present invention is to provide a scanning device which can be simply and inexpensively isolated from other parts of a microscope body, yet the position of which can be adjusted easily and precisely.

A still further object of the present invention is to provide a scanning mechanism which, relative to the moment of inertia of the scanned element, is compact and allows the design of a compact scanning microscope.

A still further object of the present invention is to provide lines for electrical, mechanical and/or optical communication and power transmission between the stationary and oscillating parts of a scanning device, without providing a route for such lines to transmit vibration to the stationary parts.

Still other advantages of the present invention will become evident in this disclosure.

SUMMARY OF THE INVENTION

The foregoing objects are achieved and the foregoing problems are solved in one illustrative embodiment of the invention for reciprocal scanning of an optical element about an axis at a substantial distance from the center of mass of the element, and having a counterrotating counterbalance rotating about the same scanning axis. In this illustrative embodiment a second counterbalance is attached to the rotating assembly containing the scanned optical element, and positioned so that the center of mass of the superassembly including the optical element and this second counterbalance is made to coincide with the axis of rotation. To make the scanner more compact, the distance between the axis and that point on this second counterbalance most distant from the axis is substantially shorter than the distance between the axis and that point on the scanned optical element most distant from the axis. By increasing the second counterbalance's cross sectional area perpendicular to the direction of scanning, the air resistance of the second counterbalance is made larger than the air resistance of the scanned optical assembly, so that the torques generated by air resistance at the two ends of the rotating superassembly including the second counterbalance and the scanned optical element tend to be equalized, and the center of rotation due to these air resistance induced torques is substantially centered on the common axis of rotation. The two oppositely rotating elements collide at the extremes of the scan (converting rotational kinetic energy into deformation of rubber bumpers) and reverse direction, but because the center of mass of the system consisting of the two oppositely rotating elements never moves, there is no momentum transferred to the base frame structure supporting the common axis of rotation during these collisions or during any other time in the scanning cycle. A conventional stepper motor supplies a periodically reversing torque between the counterrotating counterbalance and the superassembly including the scanned optical element. The casing and stator windings of this stepper motor serve as the counterrotating counterbalance, and the ball bearings of that stepper motor serve as the bearings between the oppositely rotating elements. The scanning device is suspended from the supporting base frame by strings threaded into holes drilled into the axis of the shaft of the stepper motor. Wires supplying electrical input to the casing of the motor, and wires going to the optical assembly both meet at a block mounted on a ball bearing which can revolve around that stepper motor shaft, and means are provided to adjust the stiffness of these two sets of wires so that as the scanned optical element and the counterrotating counterbalance move during scanning, the torques these wires exert on the block tend to be equal and opposite, so this block remains substantially stationary. By moving this block by means of moving the bundle of wires and tubes emerging from it, the central position of the scan can be simply adjusted to center the scanned field.

BRIEF DESCRIPTION OF THE DRAWINGS

The principles of the invention will be more particularly discussed with reference to the accompanying drawings in which.

DESCRIPTION OF INVENTION

Figures 1, 2:
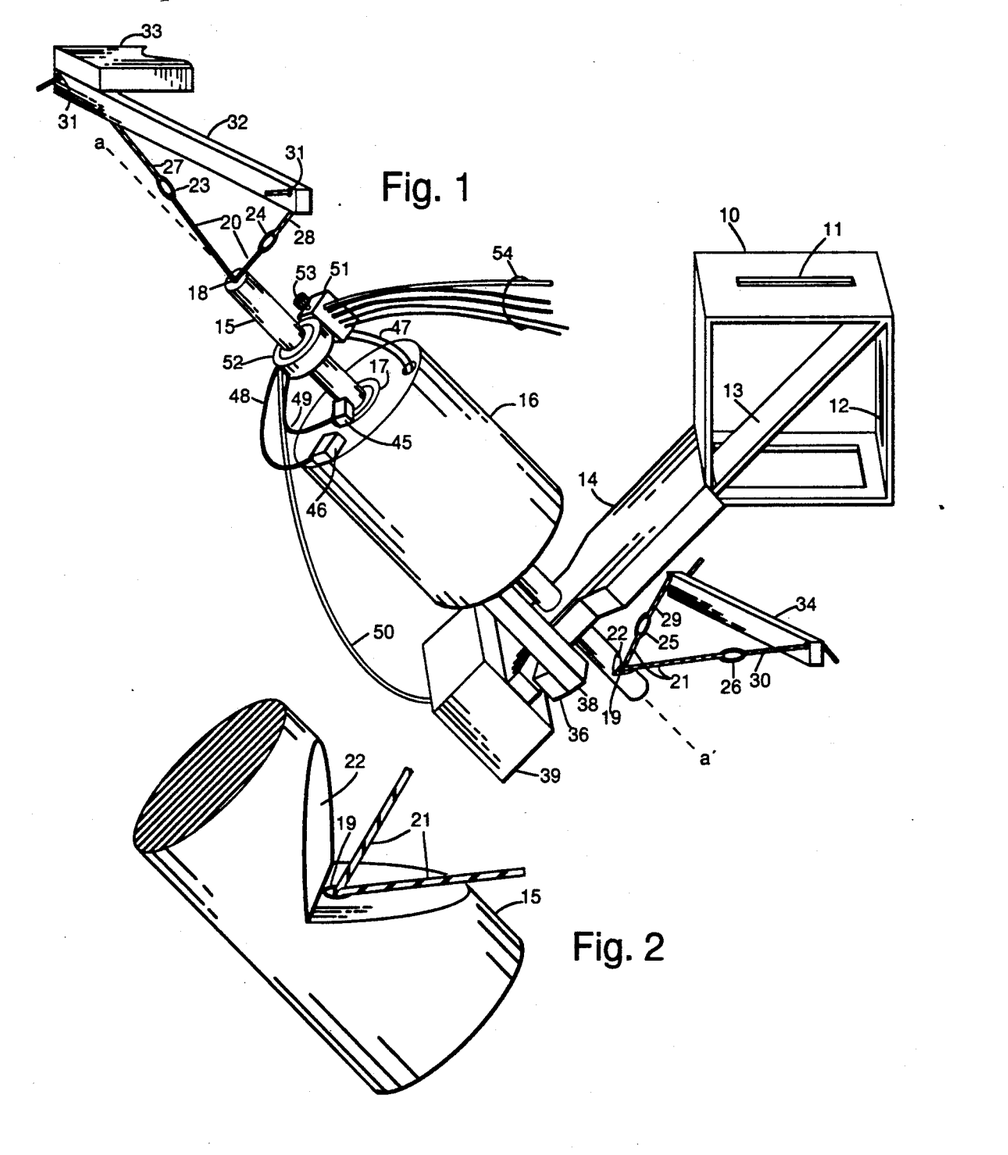
FIG. 1 is a perspective view of a scanning mechanism embodying the principles of the invention.
FIG. 2 is a enlarged perspective view showing a detail of the same scanning mechanism.

FIGS. 1,2 and 3 show the preferred embodiment of the present scanner invention, integrated with a mirror-slit assembly of a divided aperture scanned slit confocal microscope, such as the mirror-slit assembly described in my U.S. Pat. No. 3,547,512. FIG. 1 shows the scanner and attached mirror-slit assembly from a side perspective view. FIG. 2 shows a detail of this view from the same perspective, and FIG. 3 shows the same embodiment in plan view as seen from the perspective along axis a—a' of FIG. 1 looking up from below.

Referring to FIGS. 1,2 and 3 the mirror-slit assembly 10 consists of a viewing slit 11, an illuminated slit 12 and a mirror 13 one edge of which is in the plane of slits 11 and 12. Mirror 13 is positioned so that the mirror image of slit 12 coincides with slit 11. U.S. Pat. No. 3,547,512 describes how such a mirror-slit assembly should be rotated in a microscope to produce focal plane specific illumination. From the point of view of the present invention, it is sufficient for the purposes of the present disclosure to note that the three optical elements comprising this mirror-slit assembly must remain in precise alignment when subjected to the stresses of scanning. This means that the optical assembly must be sufficiently massive to provide the necessary rigidity to insure this alignment. As can be seen from FIGS. 1 and 3 the particular problem of scanning in this application is not just that the scanned element is relatively massive, but that the scanning axis is at a substantial distance from the center of mass of the scanned assembly, substantially raising its moment of inertia in relationship to its mass. In particular, the distance from the axis to the center of mass of mirror-slit assembly 10 is significantly larger than the largest dimension of assembly 10.

The arm 14, which causes mirror-slit assembly 10 to oscillate in a rotatory manner about axis a—a', is attached to the rotor shaft 15 of motor 16. Shaft 15 rotates on high quality ball bearings 17 (only one of these bearings is visible in FIG. 1) with respect to the body of motor 16. Very fine diameter holes 18 and 19 are drilled, down the axis a—a', into both ends of shaft 15. Two pieces of braided nylon fishing line strings 20 are threaded into the hole 18 at the upper end of shaft 15 and two pieces of braided nylon fishing line strings 21 are threaded into the hole 19 at the lower end of shaft 15. As shown in the detail in FIG. 2, a notch 22 is machined in the lower end of the shaft 15, so that the strings 21 can emerge from the upper end of hole 19. These strings 20 and 21 are suitably anchored in holes 18 and 19, for example by knots. The free ends of strings 20 are tied onto small rubber O-rings 23 and 24 and these O-rings are also tied, respectively, to strings 27 and 28. Strings 27 and 28 are threaded through holes 31 in bar 32 which is attached directly or via a compliant mounting to the base frame 33 of the microscope, only one part of which is shown. The free ends of strings 27 and 28 after passing through holes 31, are anchored on a length adjusting mechanism (not shown) fixed to frame 33, and which by adjusting the length of strings 27 and 28 is used to adjust the position of the scanning axis a—a', as described below. In several scanning devices built according to the present invention, these length adjusting mechanisms were geared tuning pegs from guitars. Correspondingly, strings 21 emerging from hole 18 are tied to small rubber O-rings 25 and 26 which are attached to strings 29 and 30, respectively, which are threaded through holes in bar 34 which is attached directly or via a compliant mounting to base frame 33. (The attachment between bar 34 and base frame 33 is not shown.)

In FIG. 1, bars 32 and 34 are both horizontal, and the plane containing axis a—a', and slits 11 and 12 is tilted at 45° to the vertical with the top tilted toward the reader. This 45° tilt was to simplify location of the viewing slit 11 in the field plane of a monocular microscope with a 45° tilted eyepiece. However this scanner design is applicable for any orientation of the axis a—a'.

Because the two strings 20 emerge at an angle with respect to each other from axial hole 18 and because they are pulled taut by the weight of the scanning device, they in effect allow only rotation about the axis, as the strings flex at the point where they emerge from hole 18. There is extremely low friction for turning of the shaft 15 through the relatively small angles (less than 30°). When the openings of holes 18 and 19 are polished there is surprisingly little wear on the strings, perhaps in part because the strings appear to roll rather than rub against the sides of the holes as the shaft 15 turns. The two sets of strings 20 and 21 therefore together act as an ultralow friction bearing for rotation of shaft 15.

There is, in fact, one more degree of freedom of shaft 15 allowed by this string bearing system, namely a rocking, which for short displacements approximates an axial displacement plus tilt of the axis. This particular degree of freedom was allowed to stay in the system because it caused the viewing slit 11 to translate longitudinally a small distance without upsetting any other critical optical or mechanical alignments and such a movement did not reduce image quality. In fact, such random movement of the viewing slit can improve image quality in case there is a small imperfection in the slit, which without such movement would appear in the image as a stable line (or arc) across the image. Importantly, the high quality ball bearings 17 between shaft 15 and the body of motor 16 do not allow for any significant movement of the rotation axis a—a' of the scanned assembly with respect to the rotating counterbalance, the body of motor 16. Such stability is important in order to provide that any impulse momentum to the axis during collisions between the oppositely rotating elements is cancelled between these elements rather than exciting unwanted vibrations, and also to provide for cancellations of momentum components apart from those generated just during the collisions.

Figure 4:
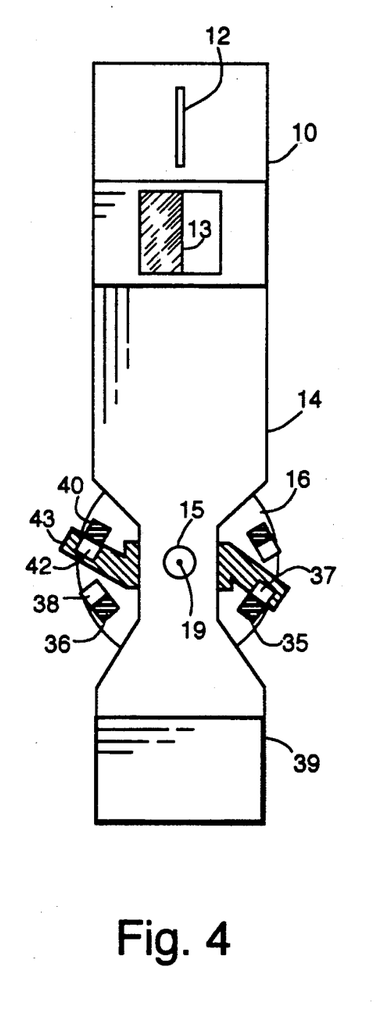
FIG. 4 is a plan view of a modification of the scanning mechanism illustrated in FIG. 1 and embodying the present invention, as viewed from the same perspective as FIG. 3.

Rubber bumpers 35 (hidden in FIG. 1) and 36 are attached respectively by blocks 37 (hidden in FIG. 1) and 38 to motor 16. These bumpers collide with arm 14, during the extremes of the oscillation, converting the kinetic energy of rotation into elastic deformation, this elastically stored energy then causing the rebounding of the arm 14 and counterbalance 39 in the opposite directions. To reduce energy loss during reversals, these bumpers have been made from highly elastic rubber-like material, for example the material from which super high bouncing toy balls are made. Other suitable types of bumpers can involve a rubber element in conjunction with a metal spring, as described in my U.S. Pat. No. 3,547,512. Because in the arrangement shown in FIG. 1 the rubber bumpers apply a reversing torque to just one end of the rotating mass containing the scanned optical assembly, an impulse force is provided by the bearings 17 during these reversals. This impulse could be substantially reduced by providing two additional rubber bumpers 40 and 41, as shown in FIG. 4, so that the reversing torque was applied symmetrically about the main axis. Such an arrangement would also reduce the demands on the rigidity of the scanned structure, because the stresses it is required to transmit would be reduced. To provide for an adjustable angle of oscillation, the blocks 42 and 37, to which the diametrically opposite bumpers 40 and 35 are affixed, might be mounted on a member 43 able to rotate about the axis a—a'. The angle of member 43 relative to the body of motor 16 could be adjusted by a flexible coupling means, such as a length of monofilament fishing line which can move longitudinally in a flexible Teflon-brand TFE tube (not shown; Teflon ® is a registered tradename of E. I duPont de Nemoirs Co. (Inc.) Wilmington, DE.) passing between motor 16 and a stationary control knob, so that this angle of member 43 could be adjusted during scanning. (The angle of scanning could be reduced more simply by reducing current to the motor 16, though scanning is less efficient if the scanning elements do not collide with the energy storing bumpers at both extremes of the scan. Furthermore, such collisions change what would be a sinusoidal scan without the bumpers into a triangle wave or linear scan, with more uniformity of image brightness over the image field.)

For economy, common commercially available ball bearing stepper motors were used as motor 16 in several scanning devices built according to the present invention, though other kinds of motor could also have been used. Because of the widespread use of standard sizes in ball bearings, it was found that if a particular motor did not have bearings of sufficient quality, they could be readily replaced by better bearings with no required additional machining, so that the scanner device with suitable bearings could be produced with very little custom precision machining, and at a comparatively low cost.

Angular position of the rotor shaft 15 with respect to the body of motor 16 is measured by means of a photodiode light detector 45 attached to rotor shaft 15, which responds to light emitted from light emitting diode 46 attached to the body of motor 16. The output of the decector 45 is amplified and the amplified signal sent to the windings of motor 16 by means of wires 47. By appropriate selection of the phase of signal applied to the motor windings, the motor compensates for frictional losses as the rotating superassembly attached to rotor shaft 15 and counterrotating body of motor 16 repeatedly collide and change direction, so that the mirror-slit assembly 10 is caused to oscillate stably. The circuit controlling electrical input to the motor 16 on the basis of output from detector 45 can also include a phase locked loop circuit, to improve frequency stability, or to phase lock the oscillation with an external synchronizing signal. Furthermore the photoelectric analog position detector system comprising light emitting diode 46 and detector 45 could be replaced by well known digital shaft encoding methods or other methods of transducing angles of shafts into electrical signals.

Figure 7:
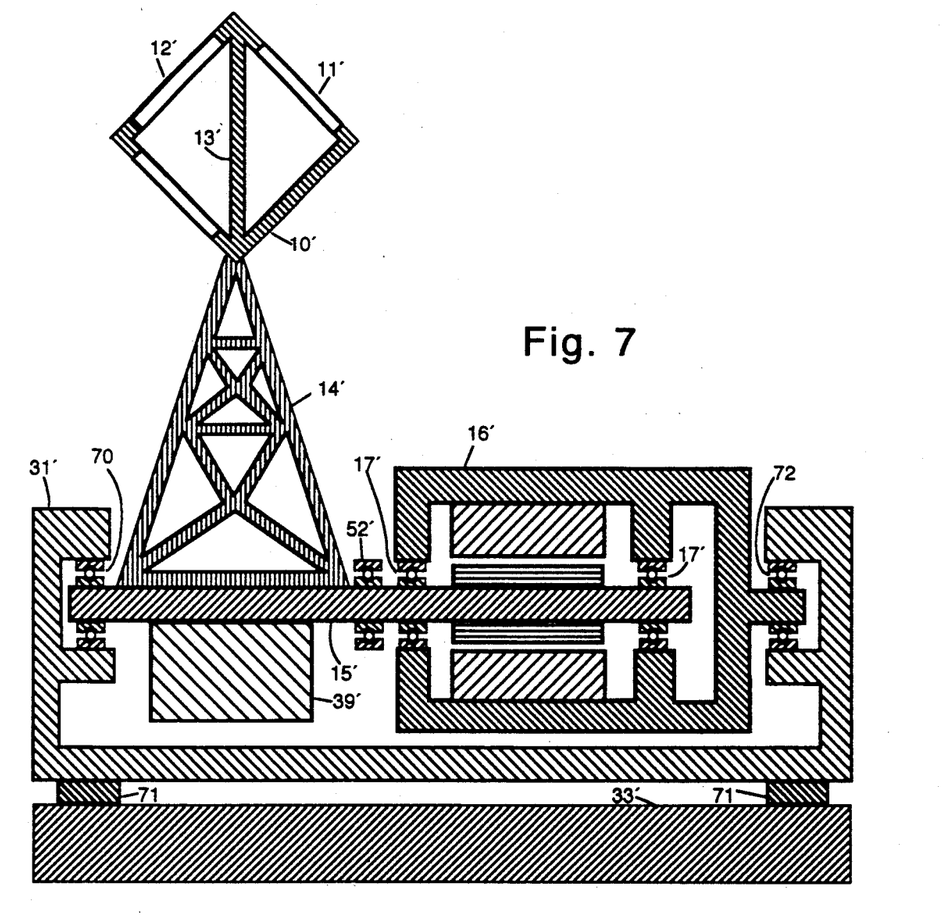
FIG. 7 is cross-sectional view of another scanning mechanism embodying the present invention.

Counterbalance 39 on arm 14 is adjusted so that the axis a—a' of rotor shaft 15 passes through the center of mass of the rigid superassembly consisting of all the elements which rotate as a rigid body along with mirror-slit assembly 10, including, in addition to the mirror-slit assembly 10, counterbalance 39, arm 14 and rotor shaft 15 with the attached rotor (hidden except in FIG. 7). Motor 16 is balanced so its center of mass is also located on axis a—a'. As mentioned, the strings 21 and 22 act as a set of bearings which cannot substantially transmit torque from the rotating elements to the microscope base frame. Furthermore because each rotating element has its center of mass centered on this axis, neither rotation of these elements, nor collision between them can transmit any lateral momentum to the axis. The net effect of the addition of counterbalance 39 is therefore to substantially reduce transmission of vibration to the microscope base frame.

The significance of the addition of counterbalance 39 will now be explained further. In the prior art device described in U.S. Pat. No. 3,547,512, because of the particular geometry of the actively scanned element, in which most of the mass is concentrated in a roughly planar volume on just one side of axis, substantially all the balancing mass must be supplied by the counterbalance 39. Therefore addition of counterbalance 39 makes a sizeable contribution to the total moment of inertia of the actively scanned element. To make this addition therefore ran in sharp conflict with the central design assumption, stated above, that for reducing vibration in such a counterrotating scanning device, the moment of inertia of the active scanned assembly should be minimized as much as possible. Even though several potential sources of vibration were adequately cancelled in the prior art scanning method of U.S. Pat. No. 3,547,512 where the scanning axis was located at the end of the scanned element in order to minimize moment of inertia, there was one particular source of vibration which was not so cancelled. This prior art method successfully eliminated vibration: 1) from transmission of the torque from the electrical torque generating means to the stationary base frame, because such torque is applied only between the two scanning elements, 2) from the tangential component of the momentum of the scanned elements, because when these elements collide they transfer this momentum to each other rather than to the stationary support and 3) from transfer of impulse momentum to the base frame, because this momentum is applied via the bearings to the base frame from opposite directions and therefore cancels. However these oppositely rotating elements also have a component of momentum in the dimension pointing from the rotation axis to the central point of the scanned element, when it is at the central scan location between the two scan extremes, and this momentum component is always in the same direction for the two oppositely rotating masses even though they are rotating in opposite directions. Therefore this particular component of momentum will not cancel in such a counterrotating scanner design. Adding a counterbalance 39 so that the superassembly including the mirror-slit assembly can be rotated on its center of mass (and at the same time rotating the counterrotating counterbalance about its center of mass) eliminates this uncanceled component of momentum. Consequently, less of the energy of scanning is dissipated in the form of vibration to the support structure, leading to more efficient use of input power. And with the elimination of this significant source of vibration generation, it is now possible to build scanners capable of scanning massive optical assemblies, and directly mount such scanners onto a compact microscope body without transmission of significant vibration to the microscope base frame. Thus it is now realized that even though it once appeared self-evident that for reducing vibration in such a counterrotating scanning device, the moment of inertia of the active scanned assembly should be minimized as much as possible, this design assumption in fact was incorrect when applied to this geometry of scanned element, to the extent that it prohibited such a substantial increasing of the total scanned moment of inertia.

Because there is negligible translation of the axis a—a' of rotor shaft 15, and because shaft 15 can rotate with virtually no friction relative to strings 20 and 21, these strings cannot transmit significant torque to the base frame of the microscope. However the elastic coupling members between the base frame of the microscope and the oscillating parts can potentially transmit oscillatory torque to the base frame and thereby transmit vibration. These flexible coupling members include wires 47 to motor 16, wires 48 to light emitting diode 46, wires 49 to the detector 45, and flexible coupling means such TFE tube 50 passing from the stationary base frame of the microscope to the mirror-slit assembly, and containing longitudinally moved monofilament nylon fishing line filaments to adjust the spacing of slits 11 and 12 during scanning. These coupling elements could also include optical fibers to illuminate the slit 12 of the mirror-slit assembly 10 or to couple the light impinging on the viewing slit 11 to a stationary electronic detector array. In the embodiment of the present invention illustrated in FIG. 1, this route of vibration transmission has been blocked by balancing the torque transmitted to the stationary base frame of the microscope by those elastic coupling elements attached to the superassembly rotating with the mirror-slit assembly 10 exactly against the torque transmitted to the stationary base frame of the microscope by those coupling elements attached to the counterrotating body of motor 16.

Such balancing of torques from the rotating and counterrotating elements is accomplished in the embodiment of the present invention shown in FIG. 1 by having all wires and flexible coupling tubes to the rotating superassembly which includes the scanned assembly 10 and to the counterrotating motor 16 pass through a block 51 attached to ball bearing 52 which rotates about shaft 15. Rotation of knurled screw 53 locks the wires and tubes in the block. By shortening or lengthening the length of wire or tubing between the oppositely rotating components and block 51 the effective stiffness of the length of wire or tubing can be increased or decreased respectively. The length of these wires and tubes between block 51 and the rotating components are adjusted so that at every position of the oscillating components, the torque exerted on block 51 by the components rotating with the scanned assembly 10 are substantially equal and opposite to the torque exerted on the block 51 by the body of motor 16. (More precisely, if the angular scanning amplitude of the shaft 15 is called $\theta_1$ and the angular scanning amplitude of the body of motor 16 is called $\theta_2$ then ratio of the stiffness of the wires going to the two counterrotating components should be adjusted to be equal to the ratio $\theta_1/\theta_2$). Because with such an adjustment the net force exerted on the block 51 during oscillation is always zero, there will be no rotation during the oscillation of the bundle 54 of wires and tubes between the block 51 and the stationary supporting structures of the microscope. By movement of bundle 54, it is possible to adjust the mean angle of arm 14. It is possible to electronically sense the position of such mean angle of arm 14 and use this information to actuate a slow motor which moves bundle 54 in a direction which automatically keeps this mean angle at a desired position.

Figure 5:
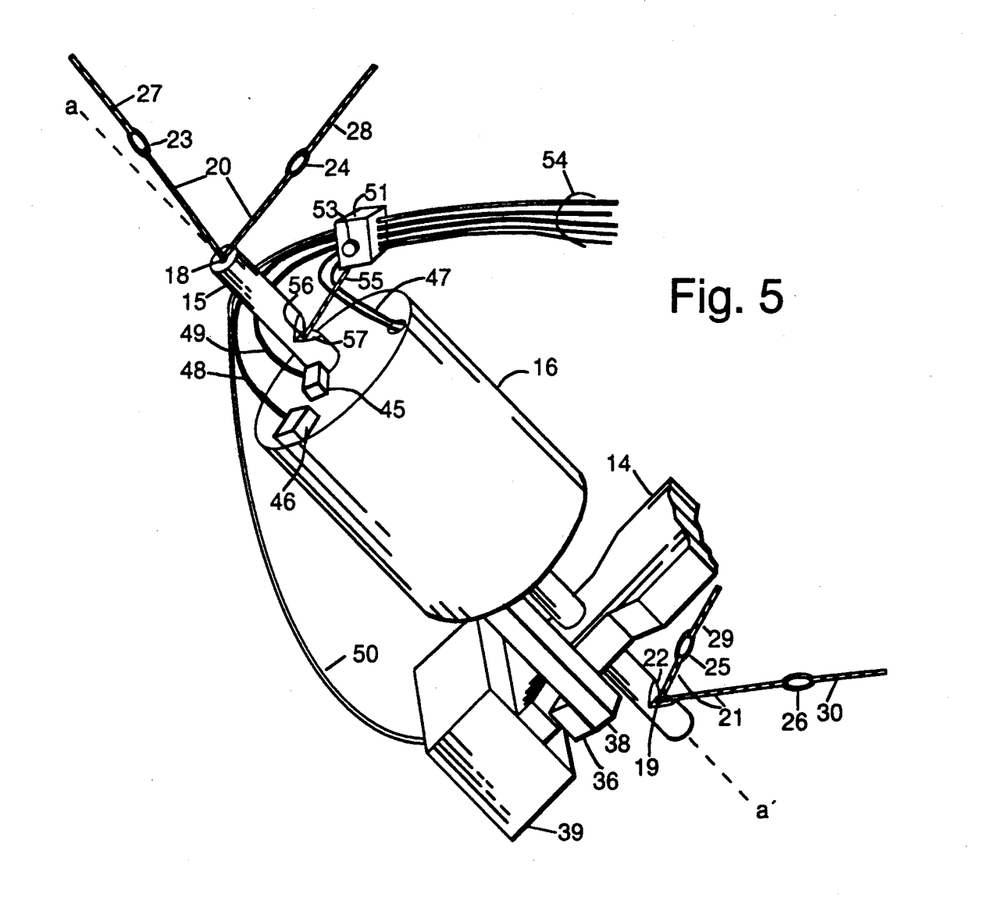
FIG. 5 is a perspective view of another modification of the scanning mechanism shown in FIG. 1 and embodying the present invention.

Because there is very little loading on ball bearing 52, it can have very low friction. However because even this small friction of ball bearing 52 appears as a torque between a stationary structure and just one of the oppositely rotating elements, this torque is unbalanced and vibration transfer can occur. With the arrangement illustrated in FIG. 5, the friction can be reduced further by replacing the ball bearing 52 with a string 55 which emerges from a hole 56 drilled along the axis a—a' of shaft 15, such hole being exposed by a notch 57 machined in shaft 15. String 55 is pulled taut when block 51 is pushed away from the axis a—a' by the spring tension of the wires and tubes entering it. For convenience of illustration, all the wires and tubes have been shown in FIG. 5 as entering block 51 from one of its faces, however a better arrangement is probably to have the wires attached to the counterbalance motor 16 enter from an opposite face from the wires from the components rotating with the scanned assembly 10, in order to equalize the torsion on block 51 during scanning.

The counterbalance 39 in the embodiment illustrated in FIG. 1 acts as a passive weight which does not contribute to powering the oscillation. However it could also contribute to the motor means powering the oscillation by replacing this passive mass of counterbalance 39 with an actively powered coil or permanent magnet of the same mass as the replaced passive metal counterbalance (as electromagnet 45 of the FIGS. 3 and 5 in U.S. Pat. No. 3,547,512, which in that illustrated embodiment serves as the motor winding). Replacing the passive counterbalance 39 with a motor means would allow, if desired, the elimination of the separate motor 16.

The O-rings 23, 24, 25 and 26 act as supporting structures compliantly mounted with respect to the base frame 33 to isolate vibration of the rotating masses from frame 33. Additionally, bars 31 and 34 to which strings 27, 28, 29 and 30 are attached to (or which these strings pass through, to an attachment on base frame 33) may be compliantly mounted to base frame 33 to further absorb residual vibration due to lack of perfect balancing. This residual vibration can be still future reduced by increasing the surface area of counterbalance 39 perpendicular to the direction of rotation, so as to tend to make the torque on arm 14 due to air resistance equal to the torque generated by air resistance acting on the scanned optical assembly 10, and the arm 14 connecting that assembly to shaft 15. Such balancing of air resistance at the two ends of the superassembly including assembly 10, causes only rotation about axis a—a', such rotation not being transmittable to the base frame of the microscope. In such a case the net lateral force transmitted to axis a—a' as a result of air resistance acting on the rotating elements is substantially zero, so air resistance does not contribute vibration to the base frame.

Figure 6:
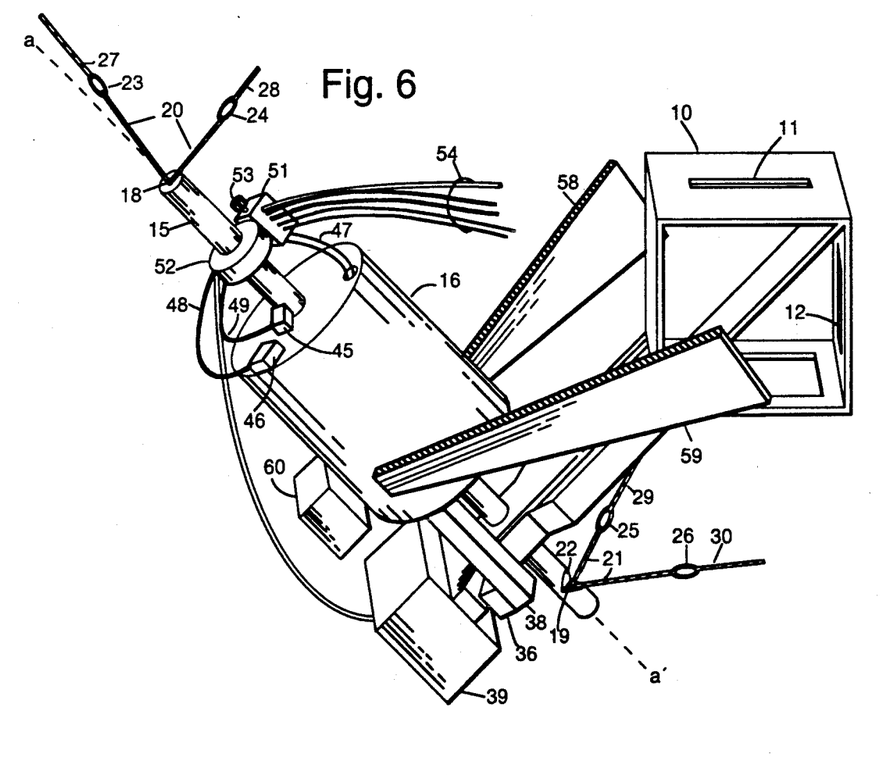
FIG. 6 is a perspective view of yet another modification of the scanning mechanism shown in FIG. 1 and embodying the present invention.

In the embodiment of the present invention illustrated in FIG. 1, counterbalance 39 is substantially more massive than assembly 10, and consequently the distance from the scanning axis a—a' to the point on the counterbalance 39 most distant from the axis is considerably less than the distance between the axis and the point on assembly 10 most distant from the axis. This difference was intended to reduce the overall size of the scanner. However as a result, the linear scanning velocity of the assembly 10 and the counterbalance 39 are significantly different. Because air resistance can have a non-linear dependence on velocity, it is possible in such case to exactly balance air resistance between the two ends of the scanned superassembly including assembly 10 only for one angular velocity, which might be chosen to be the maximum scan velocity. Without compromising the advantage in compactness of making counterbalance 39 closer to axis a—a' than assembly 10, it is possible as illustrated in FIG. 6, to improve air resistance balancing by adding air resistance elements in the form of two paddle shaped members 58 and 59 on the body of motor 16 on the same side of the axis a—a' as the scanned optical assembly 10. The mass of the paddles would be balanced by an additional counterbalance 60. Such an arrangement may provide better matching of air resistance torque at different rotational velocities, than is possible with the arrangement shown in FIG. 1 where the air resistance elements are at different distances from the axis of rotation. Obviously, the easiest way to balance air resistance at all velocities is to make the counterbalance 39 the same mass and general shape as the scanned assembly 10 and at the same distance from the axis a—a'. When there are less demands on the compactness of the scanner, for example when the scanner is contained within a large supporting enclosure of an inverted microscope, this may the best solution to the air resistance problem.

In one variation of the arrangement shown in FIGS. 1, 2 and 3, the rotor shaft 15 of motor 16 has a limited angular range of movement, but the bumpers 35 and 36 (and their supporting members, blocks 37 and 38) are eliminated, and the current to the motor windings passes through slip rings or other commutator devices allowing unlimited rotation of the stator and body of motor 16. The light emitting diode 46, instead of being attached to motor 16, is attached to the stationary microscope base frame, so that the detector 45 measures the angle of shaft 15 relative to the microscope base frame. Unlike the stepper motor 17 described in FIG. 1, where applying a current to a particular winding always results in a torque in just one known direction, in this variation, the direction of the torque caused by current through a particular winding depends on the angle of the freely turning motor body 16 relative to the base frame, so this angle would also have to be detected, and the appropriate winding to activate for a particular desired direction would be selected by a suitable logic circuit, with inputs of the angle of both the shaft 15 and the body of motor 16 with respect to the base frame (as well as an external driving or synchronizing signal if the scanner is to be driven rather than free oscillating). This variation requires the electrical power in the motor to supply all the energy which in the earlier described embodiments was stored elastically. However it allows the times of reversal of the active oscillating assembly to the locked to an external synchronizing signal which does not have to be periodic, or it allows the position of the scanned assembly to be synchronized with an arbitrary and not necessarily periodic external waveform. The slip rings in this above arrangement might transfer momentum to the stationary supporting structures of the optical instrument through friction. These slip rings can be eliminated by employing permanent magnets or ferromagnetic pole pieces in the stator of the motor and by locating all windings in the rotor. The magnitude and polarity of current to the appropriate windings is controlled by a logic circuit as function of the measured relative angle between rotor and stator, and the intended direction and velocity of the active scanned assembly.

The scanner shown in FIGS. 1 and 2 has been used with success in a microscope having a monocular eyepiece tilted 45° to the vertical. The eyepiece tube of the standard monocular microscope is replaced by a rigid supporting structure which allows the mirror slit assembly 10 to oscillate in the space normally occupied by such eyepiece tube. Viewing slit 11 oscillates in the plane of focus of the eyepiece. The string suspension arrangement allows simple adjustment of the position of the mirror-slit assembly 10. Although this fact is not evident from the perspective view of FIG. 1, the two strings 20 emerge from hole 18 at an angle of approximately 90° from each other, in the plane containing both strings, and likewise for strings 21 emerging from hole 19. If it is assumed that the scanner and mirror slit assembly in FIG. 1 is tilted so that the top is tilted toward the reader, pulling string 29 alone causes movement of the mirror-slit assembly 10 such that the edge of mirror 13 located in the plane of slits 11 and 12 moves in a direction which causes the aperture dividing mirror 13 to allocate more area of the objective to the viewing rays and less to the illuminating rays. Since the best resolution of the divided aperture microscope is achieved with more than half the objective devoted to viewing, but the brightest image is achieved with equal portions devoted to viewing and illumination, this adjustment is a very useful one for making the best tradeoff of allocation of the objective aperture between viewing and illumination for each particular application. Also pulling strings 28 and 30 together will adjust the focus position of the viewing slit 11 relative to the real image produced by the microscope objective (not shown). Such an adjustment is useful for fine adjustment of the actual tube length of the microscope for each objective to minimize spherical aberration.

Instead of the rotor shaft 15 being suspended from the stationary base frame 33, and the body of motor 16 being supported by bearings 17 from that suspended rotor shaft, the body of motor 16 could be the element directly suspended or otherwise directly supported by the stationary base frame, and the rotor shaft 15 supported by bearings from the body of motor 16. Although the string suspension has proven extremely useful, inexpensive and durable, it might be replaced with low friction ball bearings which allow rotation of the shaft 15 with respect to the base frame. Because ball bearings might have more friction than the string suspension arrangement illustrated in FIGS. 1 and 2, it is desirable to cancel out any torque transmitted to the stationary supporting member, base frame 33. For example, in the arrangement shown in FIG. 7, one such ball bearing 70 is between the rotor shaft 15' (rotating with active scanning assembly 10') and an intermediate supporting structure 31' which is attached either directly to or via a compliant mounting 71 to base frame 33'. Another such ball bearing 72 is on the same axis, but between the axis of the counterrotating counterbalance 16' and the intermediate supporting structure 31'. The small torque transmitted through these bearings 70 and 72 to structure 31' will tend to cancel, therefore reducing vibration transfer to base frame 33'. (The numbered components with primes in FIG. 7 correspond in function to the corresponding unprimed numbered components in earlier figures.)

FIG. 7 also shows a desirable alternative to the support arm 14 shown in the earlier figures. Support arm 14 was shown as a solid beam of elongated cross section oriented so that its greatest strength and minimum air resistance was in the direction of the scanning. The strength in such dimension is required to transmit the impulse force to change the direction of the mirror slit assembly at during the reversals of the motion. It is desirable to minimize the air resistance of arm 14 to simplify the job of balancing this air resistance by the cross section of counterbalance 39 which is traveling at a lower linear velocity than the mirror-slit assembly 10. These ends are accomplished by replacing solid arm 14 with an open ended triangulated system of sheets of light weight and rigid material such as the supporting arm 14' shown in cross section in FIG. 7.

The arm 14 and the mirror-slit assembly 10 on the present prototype have been fabricated of conventional plastic (e.g., polycarbonate) and metal, so a considerable mass reduction is possible with substitution of ultra light weight high performance materials such as carbon fiber composites. Such refinements will allow even faster scanning and higher amplitude scanning with even less residual vibration.

Although the description above contains many specificities, these should not be construed as limiting the scope of the invention but as merely providing illustrations of some of the presently preferred embodiments of this invention. For example in embodiments in which the angle of rotation between rotor 15 and body of motor 16 is limited, the ball bearings between these elements could be replaced by leaf spring bearings, as described in my U.S. Pat. No. 3,547,512. The strings 20 and 21, instead of being nylon, could be aramid fiber or some other fiber. Although the holes 18 and 19 were drilled directly in the steel shaft of the motor in the embodiments described herein, the scanning mechanism might be more durable if they are drilled in a harder substances such as sapphire which is then bonded to the motor shaft. The bumpers 35 and 36 have been described as made of an elastic material such as rubber, but they could be replaced by taut strings, or by magnetic bumper means which by repelling the oppositely rotating elements, stores the rotational kinetic energy in a magnetic rather than a mechanical form. The motor 16 has been described as electrically powered, but for some applications, the fields generated by such motors could create interference with sensitive measurements, and a motor in which pneumatic or spring stored power is transduced into the required periodically varying driving torque would be a desirable alternative, without departing from the scope of the invention. Although the base frame has been referred to as "stationary," it will be understood that the term stationary is intended in this context as a relative term, meaning stationary with respect to a user, or a given frame of reference, and is meant to distinguish this frame from the rotating elements of the scanner rather than to indicate that the base frame is truly motionless. The base frame could be stationary with respect to a person's hand, for example, or with respect to an automobile. Although this scanning mechanism has been illustrated scanning a mirror-slit assembly, it will be obvious to one skilled in the art that the scanning device described herein could be used to scan other types of things which must be scanned about axes at substantial distances from the thing, and where vibration to the supporting structure cannot be tolerated. These scanned things include lenses, mirrors, prisms, antennae, light emitting arrays, light sources and detectors, sources and detectors for non-visible radiation, ultrasound transducers, printheads, pens, brushes, erasers, polishing heads, sanding heads, massage heads, blades, saws, needles, nozzles, probes, fans, propellers, tools, mixing chambers, clamps and fixtures for holding such items and the like. Thus the scope of the invention should be determined by the appended claims and their legal equivalents, rather than by the examples given.

I claim:

1. In scanning apparatus including a base frame, a scanned element reciprocally rotated with respect to said base frame in an arc about a rotation axis external to said element, and a counterrotating counterbalance adapted to rotate in a rotational direction opposite that of said element, means for scanning said element including:

an arm for spacing said element from said rotation axis;
   a second counterbalance;
   means for connecting at least said second counterbalance, said arm and said element so as to form a superassembly of components adapted to rotate as a unit about said rotation axis, said superassembly having a center of mass, the center of mass of said element and the center of mass of said second counterbalance being located on opposite sides of said rotation axis, and said second counterbalance being located such that said rotation axis passes through the center of mass of said superassembly thereby to provide balancing of said superassembly on said rotation axis;
   bearing means allowing said superassembly to rotate about said rotation axis while substantially preventing movement of said rotation with respect to the axis of rotation of said counterrotating counterbalance, so that said superassembly and said counterrotating counterbalance can coact to produce vibration cancellation; and
   power transducing means for applying a time varying torque to said element such that said element rotates reciprocally about said rotation axis thereby resulting in substantial reduction in the transmission of vibration to said base frame.

2. The apparatus of claim 1 wherein said counterrotating counterbalance rotates about said rotation axis, such that said rotation axis passes substantially through the center of mass of said counterrotating counterbalance.

3. The apparatus of claim 2 including a shaft member adapted to rotate with said superassembly, the axis of said shaft member being substantially coincident with said rotation axis, and said counterrotating counterbalance surrounding said shaft member for a substantial length along said axis.

4. The apparatus of claim 1 wherein the distance from said rotation axis to the center of mass of said element is substantially farther than the distance from said axis to the center of mass of said second counterbalance.

5. The apparatus of claim 1 wherein said element performs a predetermined task for which scanning is required, and wherein said element, together with any other element which cooperates with said element in the performance of said task is contained within a volume on only one side of said rotation axis, said volume being bounded on two sides by planes each containing said rotation axis, and making an angle no greater than 45 degrees with respect to each other.

6. The apparatus of claim 1 wherein for at least one non-zero scanning velocity, the air resistance induced force on said superassembly and the air resistance induced force on said counterrotating counterbalance summate to impart substantially zero force on said rotation axis of said element.

7. The apparatus of claim 1 wherein a distance from said rotation axis to the center of mass of said element is larger than the largest dimension of said element.

8. The apparatus of claim 1, wherein said arm is elongate, the elongated axis of said arm being oriented substantially perpendicular to said rotation axis.

9. The apparatus of claim 1, and further including bumper means adapted to limit the maximum angle of rotation between said superassembly and said counterrotating counterbalance.

10. The apparatus of claim 1, including an electric motor having a body forming said counterrotating counterbalance.

11. The apparatus of claim 1 wherein said base frame includes a substantially stationary structure, and including at least one string passing from said substantially stationary structure to said axis, at least part of the weight of said superassembly being supported by said string.

12. The apparatus of claim 1 and wherein said bearing means includes at least one bearing including a first bearing surface rotating as a unit with said counterrotating counterbalance and a second bearing surface rotating as a unit with said superassembly, said bearing surfaces being directly apposed.

13. The appartus of claim 1, further including an intermediate supporting structure compliantly mounted to said base frame and including at least one bearing including a first bearing surface rotating as a unit with said intermediate supporting structure, said one bearing including a second bearing surface rotating as a unit with said superassembly, said bearing surfaces being directly apposed.

14. The apparatus of claim 1, including a joining member and flexible coupling means connected thereto, said coupling means coupling said joining member to said superassembly and to said counterrotating counterbalance, and further including means allowing said joining member to rotate about said axis at a substantially constant distance therefrom, the stiffness of said flexible coupling means being adjusted so that there is substantially no net torque on said joining member as said superassembly and said counterrotating counterbalance rotate in opposite directions during scanning.

15. The apparatus of claim 14 wherein said flexible coupling means includes energy conducting means.

16. The apparatus of claim 1 wherein said scanning device is part of a scanning optical instrument, and wherein said element is an assembly including a plurality of optical apertures and means for creating an image of at least one aperture of said plurality on another of said apertures.

17. The apparatus of claim 1, and including means for applying time varying torque to said superassembly such that the associated reaction torque is applied directly to said counterrotating counterbalance instead of to said base frame.

18. The apparatus of claim 1, and including means for permitting rotation of said counterrotating counterbalance through an angle greater than 360 degrees.

19. In an optical instrument wherein an assembly consisting of a plurality of optical elements is scanned relative to a base frame about a rotation axis which is external to said elements and to the space between said elements, while said elements remain substantially motionless with respect to each other, said instrument including a counterrotating counterbalance which rotates in the rotational direction opposite said assembly, a vibration reducing apparatus for scanning said assembly comprising:

an arm to which said assembly is attached;
means rotating said arm with respect to said base frame about said rotation axis which is external to said elements and to the space between said elements;
a second counterbalance;
means for connecting at least said assembly, said arm and said second counterbalance so as to form a superassembly of components adapted to rotate as unit about said rotation axis, said superassembly having a center of mass, the center of mass of said elements and the center of mass of said second counterbalance being located on opposite sides of said rotation axis, and said second counterbalance being located such that said rotation axis passes through the center of mass of said superassembly thereby to provide balancing of said superassembly on said rotation axis; and
power transducing means for applying a time varying torque to said assembly so that said assembly rotates reciprocally about said rotation axis thereby resulting in substantial reduction in the transmission of vibration to said base frame.

20. In a scanning device including a base frame, a scanned element reciprocally scanned with respect to said base frame in an arc about a rotation axis external to said element, said device including a counterrotating counterbalance adapted to rotate in the opposite rotational direction from said element, means scanning said element while reducing vibration of said base frame comprising:

an arm spacing said element from said rotation axis;
a second counterbalance;
means for connecting at least said element, said arm and said second counterbalance so as to form a superassembly of components adapted to rotate as unit about said rotation axis, said superassembly having a center of mass, the center of mass of said element and the center of mass of said second counterbalance being located on opposite sides of said rotation axis, and said second counterbalance being located within said superassembly such that said rotation axis passes through the center of mass of said superassembly thereby to provide balancing of said superassembly on said rotation axis; and
power transducing means for applying time varying torque to said superassembly such that an associated reaction torque is applied directly to said counterrotating counterbalance instead of to said base frame, such that said element can rotate reciprocally about said rotation axis while substantially reducing the transmission of vibration to said base frame.

* * * * *

UNITED STATES PATENT AND TRADEMARK OFFICE
CERTIFICATE OF CORRECTION

PATENT NO. : 5,210,636
DATED : May 11, 1993
INVENTOR(S) : Stephen C. Baer

It is certified that error appears in the above-indentified patent and that said Letters Patent is hereby corrected as shown below:

Column 15, line 62, after "rotation" insert -- axis --.

Signed and Sealed this

Fourth Day of July, 1995

Attest:

BRUCE LEHMAN

Attesting Officer

Commissioner of Patents and Trademarks